Dec. 12, 1967   E. G. EWING   3,357,658
PERIPHERAL JET ROCKET ENGINE
Filed Sept. 8, 1965   3 Sheets-Sheet 1
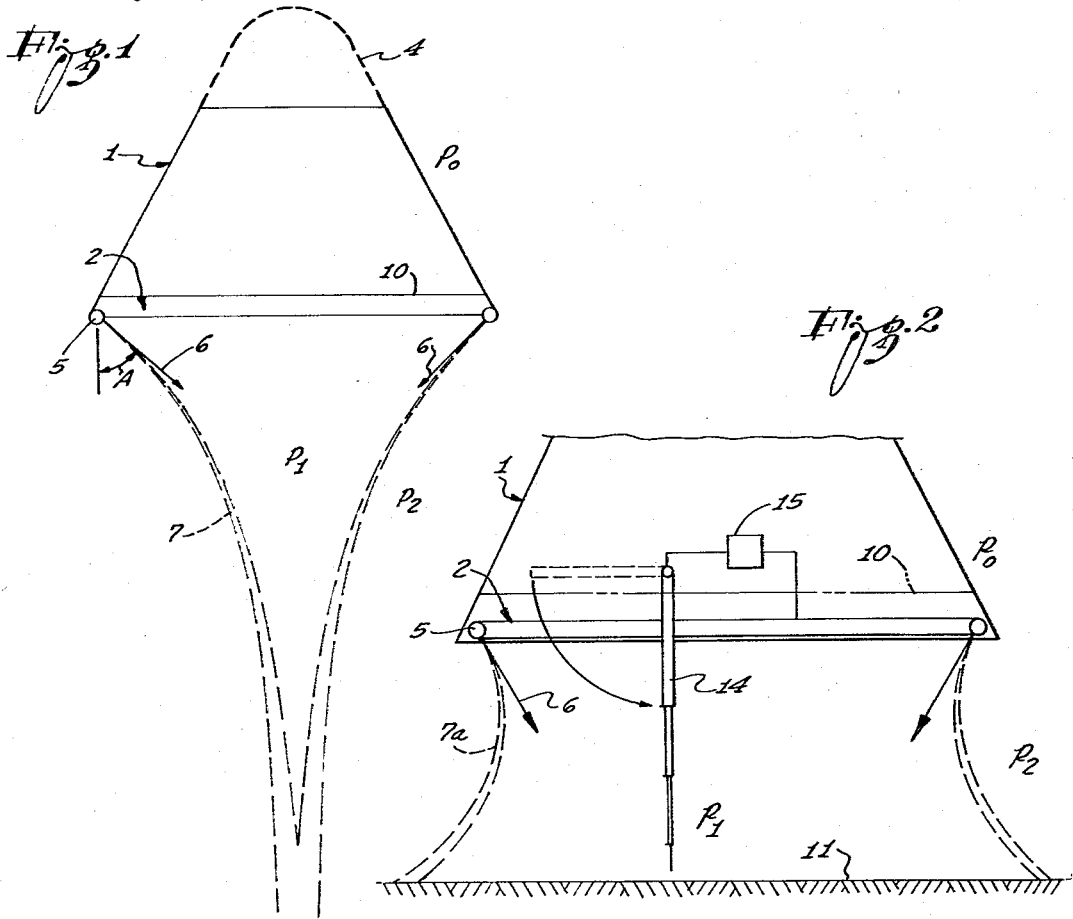
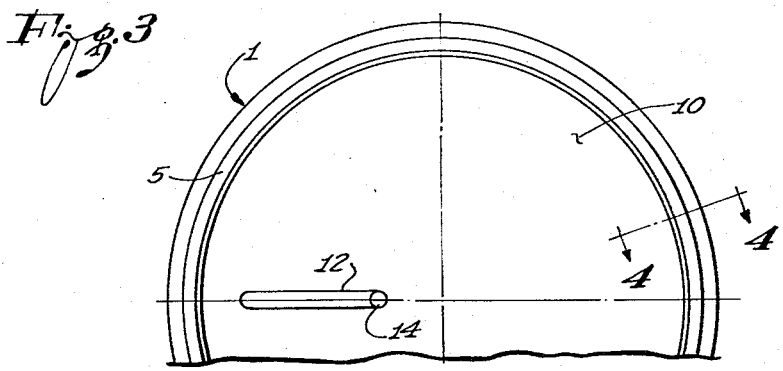
INVENTOR:
Edgar G. Ewing
By William W. Rundle
Agent Dec. 12, 1967  E. G. EWING  3,357,658
PERIPHERAL JET ROCKET ENGINE
Filed Sept. 8, 1965  3 Sheets-Sheet 2
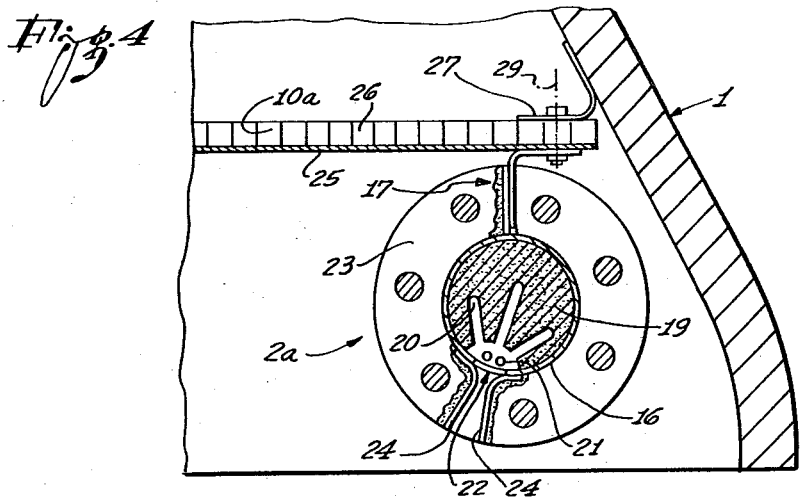
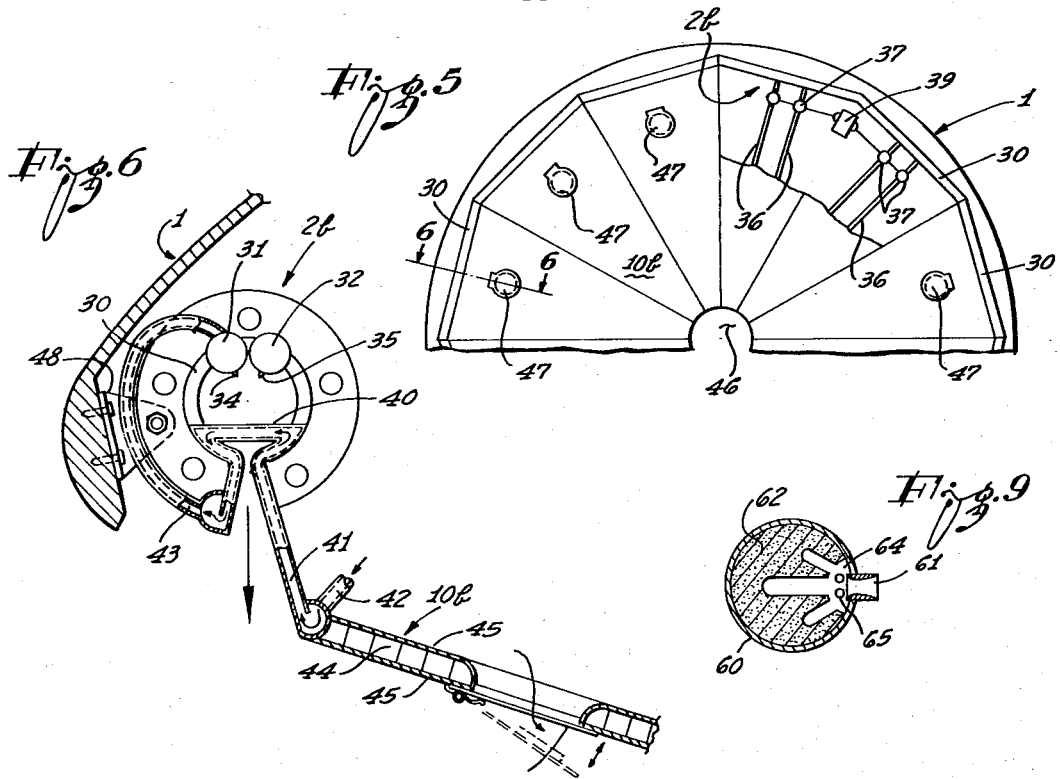
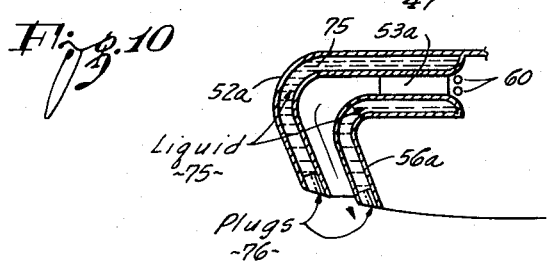
INVENTOR:
Edgar G. Ewing
By William W. Rundle
Agent Dec. 12, 1967  E. G. EWING  3,357,658
PERIPHERAL JET ROCKET ENGINE
Filed Sept. 8, 1965  3 Sheets-Sheet 3
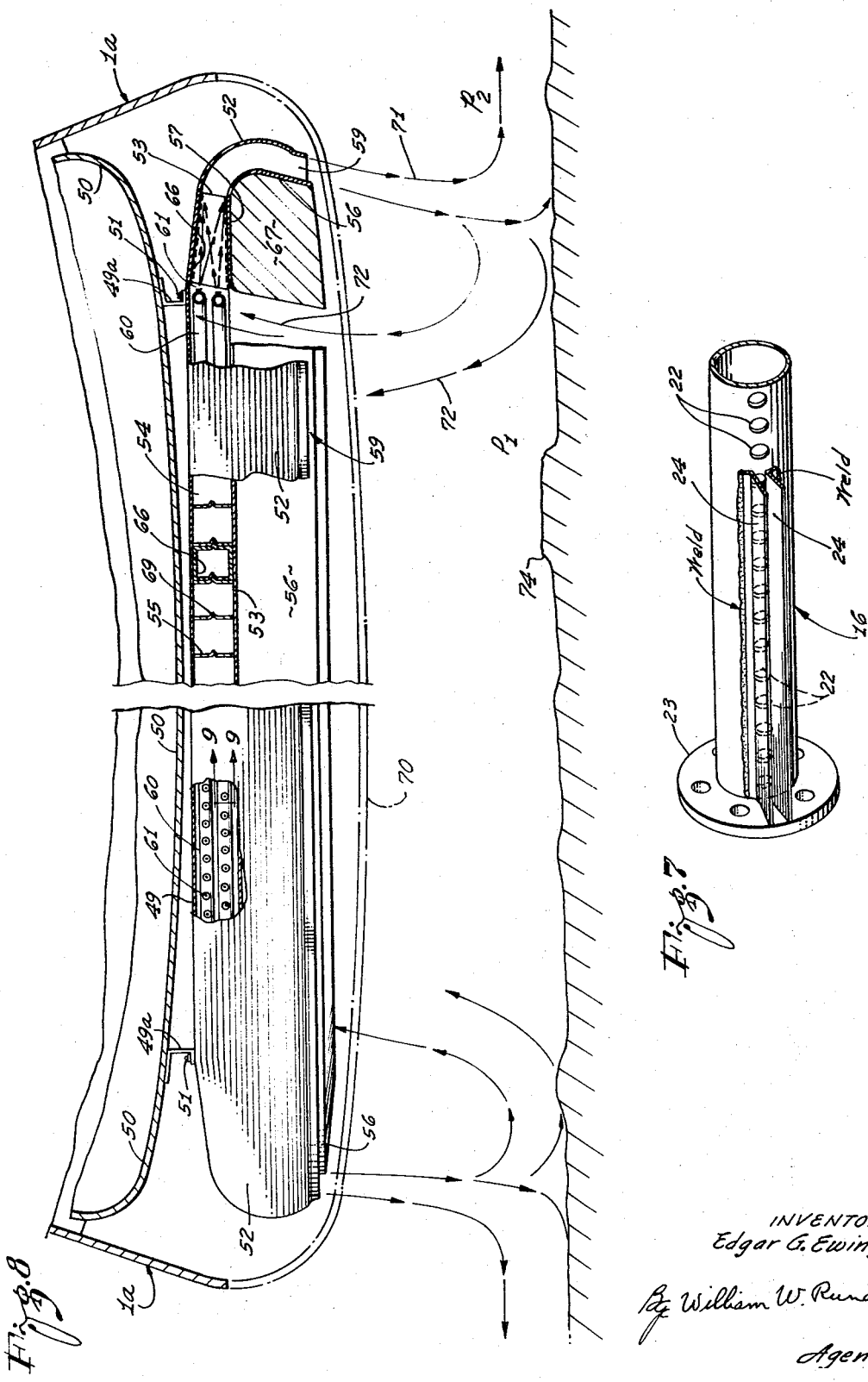
INVENTOR:
Edgar G. Ewing
By William W. Rundle
Agent

United States Patent Office 3,357,658
Patented Dec. 12, 1967

3,357,658
PERIPHERAL JET ROCKET ENGINE
Edgar G. Ewing, Thousand Oaks, Calif., assignor to Northrop Corporation, Beverly Hills, Calif., a corporation of California
Filed Sept. 8, 1965, Ser. No. 485,706
7 Claims. (Cl. 244—100)

ABSTRACT OF THE DISCLOSURE

A solid or liquid fueled rocket engine having a central structural diaphragm or bulkhead and a peripheral nozzle directed approximately perpendicular to the diaphragm. Space is provided between a combustion chamber and the duct forming the peripheral nozzle where recirculation takes place especially during ground-effect conditions. The duct walls and surrounding structure form a shock absorbing landing skid.

---

The present invention relates to rocket engines, and more particularly, to a rocket engine having an annular or peripheral nozzle and other means especially suited as a decelerator for landing operations.

The usual rocket engine having a central circular nozzle is not suitable for landing a vehicle due to the strong destabilizing, heating, and erosion effects generated by impingement of the jet on the landing surface.

Also, conventional rockets are primarily high-velocity engines, and are not efficient at low and zero vehicle speeds associated with landing maneuvers. Moreover, the efficiency is further reduced when a cluster of divergent nozzles is used to mitigate the other deficiencies.

One problem common to all base-mounted rocket systems designed for lowering a load to the ground is the hazard of setting fire to the ground cover. Typical of erosion effects, the usual high-power, relatively thin rocket jet blasts craters in the landing surface beneath the vehicle which reflect the jet and entrained fragments back against the vehicle.

It is an object of this invention to provide a rocket engine and rocket landing device which eliminates or minimizes all the foregoing deficiencies.

A further object of the present invention is to provide a rocket engine adapted to be secured to the base of a vehicle or load to be landed such that the base pressure will augment rather than diminish the thrust momentum of the jet.

It is another object of this invention to efficiently utilize the well known "ground effect" principle for base pressure augmentation in the operation of the rocket engine during landing.

A further object is to provide a landing decelerator having a suitable landing gear or surface bearing structure for realizing a soft landing under conditions of uneven ground and residual horizontal and vertical velocity.

It is a still further object of the present invention to provide a landing decelerator with means for producing recirculation in the gas cushion to improve the action thereof.

Another object is to provide a landing decelerator rocket having integral cooling means therein.

Briefly, my invention in one preferred form comprises a central diaphragm member having a peripheral duct directed to produce an annular jet skirt of exhaust from the bottom or base of a vehicle. A tubular rocket chamber nozzle (or nozzles) feeds the duct, and space is preferably provided between the chamber and the peripheral duct entrance for recirculation of air and exhaust gases when the latter are present near the ground. The duct outlet walls themselves, and in conjunction with attached crushable material, may be configured to act as a shock absorbing landing skid. Cooling may be supplied by ablative material on the duct inner walls, or by means of cooling fluid therein.

This invention will be more fully understood by reference to the detailed description of specific embodiments to follow, together with the accompanying illustrative drawings thereof, wherein:

FIGURE 1 is a diagram of a vehicle having a rocket engine of the present invention attached to the base thereof, showing its operation during decelerating descent while being relatively far from the ground surface.

FIGURE 2 is a diagram of the invention when close to the surface, showing its operation utilizing the "ground effect" principle.

FIGURE 3 is a bottom diagram view of the engine in FIGURE 1, showing the diaphragm and the peripheral slot nozzle.

FIGURE 4 is a sectional view taken as indicated by section line 4—4 in FIGURE 3 and shown in an upright position, showing in more detail an example of a solid propellant rocket engine and diaphragm structure.

FIGURE 5 is a bottom diagram view of an alternate rocket engine embodying a liquid propellant system.

FIGURE 6 is a sectional view taken as indicated by section line 6—6 in FIGURE 5, showing details of the liquid propellant rocket engine.

FIGURE 7 is a perspective view of the type of solid propellant engine segment of FIGURE 4, showing a slit nozzle and coupling flange.

FIGURE 8 is a cut-away elevation view, partly in section, of a peripheral rocket engine assembly, showing a complete preferred embodiment.

FIGURE 9 is a cross section taken as indicated by section line 9—9 in FIGURE 8, showing details of the solid propellant chamber.

FIGURE 10 is a sectional view of an alternate type of nozzle duct, showing a different type of cooling means than in FIGURE 8.

Referring first to FIGURE 1 for a detailed description of the present invention, a vehicle 1 has a peripheral rocket engine assembly 2 attached to the base thereof. A nose compartment 4 (shown with cover jettisoned) may be utilized to contain a packed, deployable parachute system, for example. The rocket engine 2 includes a peripheral combustion chamber 5 discharging in the direction shown by arrows 6. Chamber 5 directs an annular curtain of exhaust products at a predetermined angle A inward from the vertical, which angle may be anywhere from zero to sixty degrees for example. At altitude, the exhaust gases form an inwardly converging jet curtain 7 as shown in FIGURE 1 when pressure at $p_1$ tends to become less than at $p_2$. In FIGURES 1 and 2, the region $p_0$ is the ambient pressure around the vehicle. Region $p_1$ is the total pressure in the plenum formed by the jet curtain 7 or 7a, and does not include thrust pressure on the combustion chambers. Region $p_2$ is the external pressure on the surface of the jet curtain 7 or 7a.

An important component of this invention is a solid, substantially continuous, diaphragm member 10 which seals the bottom of the vehicle 1 and forms a reaction member against which a positive differential pressure is produced. The diaphragm 10 may comprise any suitable form of structure, such as a normally-closed lower side of the vehicle 1.

FIGURE 2 shows the general shape of the jet curtain 7a when the peripheral jet is operating close to the ground 11. The parachute system from nose compartment 4 may be deployed to lower the vehicle 1 to a height where the rocket assembly 2 is actuated as a landing decelerator. For the latter purpose, diaphragm 10 may be provided with a suitable opening 12 (FIGURE 3) for extension of a telescoping ground probe 14, for example, having a predetermined extended length. When probe 14 or other surface sensing and ranging means is actuated by close approach to ground 11 during descent, the rocket engine is started automatically by control means 15 connected between the probe 14 and the rocket ignition means, such control arrangements being conventional in the art. As indicated, the surface distance sensing means may be electronic or other than the mechanical type illustrated by probe 14.

The circular shape of the peripheral rocket chamber 5 shown in FIGURE 3 is illustrative only, since the chamber and associated nozzle may be any other suitable shape such as that of a rectangle or many-sided polygon for instance.

The magnitude of $p_1$ may be less than $p_2$ and $p_0$ at times when the vehicle is not in the "ground effect" region, but not when operation is in a vacuum. The present invention always provides a positive differential pressure $p_1-p_0$ when in operation close to the ground or in vacuum, which differential augments the jet momentum thrust.

My invention comprises a rocket engine which may be either the liquid or solid propellant type. As shown in FIGURE 4, a solid propellant rocket engine 2a comprises a toroidal tube segment 16 supported by pressure sealing structure 17 and having a solid propellant charge 19 therein. Longitudinal "ports" 20 provide the desired burning surface area, and igniters 21 serve to initiate rocket burning. The tube segment 16 is provided with a row of apertures 22 feeding into an extended nozzle 24 directed at the desired angle. Here, the diaphragm 10a includes a thin sheet of heat-resistant material 25 stiffened with a honeycomb panel 26. The entire assembly is adapted to be fastened to a planar flanged portion 27 of the vehicle body 1 along a circumferential attachment line 29.

The nozzle segment 16 is further shown in FIGURE 7 which serves to clarify the construction shown in FIGURE 4. Here, the row of outlet apertures 22 is provided along the length of the cylindrical segment 16, and shaped nozzle lips 24 are fixed (as by welding) to the outside of the cylinder on opposite sides of the row of outlet apertures 22. Coupling flanges 23 are provided on the ends of the tubular segments 16. In practice, one or both ends of segment 16 may be cut off at an angle.

FIGURES 5 and 6 show an example of a liquid propellant rocket engine 2b construction embodied in this invention. In this illustration, a plurality of straight combustion chamber segments 30 are installed in end-to-end fashion at an angle, to extend around the entire engine periphery. Each segment 30 has two propellant manifolds 31 and 32 therein carrying respective multiple injector heads 34 and 35. Each manifold 31 and 32 is supplied by a separate propellant line 36 having a control valve 37 therein. Propellant lines 36 lead from suitable fuel and oxidizer reservoirs (not shown). The valves 37 of each segment 30 are controlled from actuating means 39 to independently govern the magnitude of the thrust of each pair of nozzle segments relative to any other pair of segments. Thus, by means of a number of actuators 39, both simultaneous and differential variation of the jet momentum around the periphery is effected.

If desired or necessary, the engine also may have different fixed nozzle angles in different adjacent chamber segments 30 around the periphery.

The continuous-aperture nozzle segment 30 as shown in FIGURE 6 preferably has a plurality of tie tubes 40 across the nozzle inlet at intervals along the segment. The chamber and nozzle are cooled by routing the fuel supply through the nozzle wall 41 from an inlet 42 through tube 40 to an outlet 43, and thence to fuel manifold 31.

An alternate form of diaphragm 10b is also shown partially in FIGURE 6. Here, it consists of several sectors, each comprising a sandwich of rigidizing material 44 bonded between two skin sheets 45. Other equivalent forms of diaphragm structure may obviously be used. Further, the diaphragm may have a central opening 46 (FIGURE 5) therein to accommodate the nozzle from a central rocket engine, as might be required on a lunar landing vehicle.

Under circumstances where $p_1-p_0$ may become negative in atmospheric flight, ambient air may be admitted through check valves 47 in the diaphragm 10b to minimize the resultant loss in total thrust. This ambient air will enter the vehicle 1 between the outside of the chamber segments 30 and the outer skin, passing upwardly beside chamber support brackets 48. The air will then pass down through the check valves 47 into the central plenum of the peripheral jet. It is to be noted that when $p_1$ is greater than $p_0$, the check valves 47 will be automatically closed.

FIGURE 8 shows in more detail a complete peripheral jet landing rocket of preferred form. The main member is a solid or substantially solid bulkhead 49 forming the diaphragm previously referred to. It is fastened to a structural rim 49a on the bottom of an internal cabin wall 50 of the vehicle 1a as by bolts or studs 51 for example.

The outer portion of bulkhead 49 is formed into or connected to a downwardly curved outer skirt flange 52. An annular duct member 53 having radial passages 54 is fixed to the bulkhead 49 just inwardly of the start of the outer skirt flange 52. Such radial passages 54 are formed by vertical inner duct partitions 55. Below duct member 53 is an inner skirt flange 56 having a top plate 57 fastened to the lower side of duct member 53. This inner skirt flange 56 is curved to cooperate with outer flange 52 to form a desired peripheral nozzle space 59.

At the inner end of duct 53, but preferably spaced therefrom, is one or preferably two circular tubular rocket chambers 60, also attached to bulkhead 49, each having a multiplicity of cylindrical welded-in exhaust inserts 61 (FIGURE 9) facing outwardly into the entrance of duct 53. Chambers 60 are spaced apart for reasons which will be described later. An extruded or molded solid propellant charge 62 is loaded into the chambers 60, with a preformed space 64 adjacent the exhaust inserts 61. In the space 64, a pair of extended "line" igniters 65 is provided, these being of a very fast burning material in order to set off the solid propellant 62 at all circumferential positions simultaneously.

An ablation cooling medium is placed in the form of a coating 66 on all the interior walls and partitions 55 of the duct 53, and may also be provided on the interior walls of the outer and inner skirt flanges 52 and 56. The actual thickness of the coating 66 is similar to a heavy paint film; it is exaggerated in the illustration for clarity.

A ring shaped decelerator structure 67 is built into the annular space partially defined by the inner skirt flange 56 and the top plate 57 thereof. This is of a deformable material designed to absorb energy locally when the vehicle 1a contacts the ground. It will be noticed that the skirt flanges 52 and 56 are slanted slightly inward toward the center and will deform readily upon impact. In addition to directing the jet curtain inwardly as desired, this structure provides a smooth gliding relative to the landing surface in the event of residual horizontal velocity, rather than an abrupt digging in and resultant shock to or overturning of the vehicle.

In addition, for shock absorbing purposes, the vertical duct partitions 55 may be joggled as indicated by numeral 69, to give a tendency to buckle under sharp landing loads if they occur, thus further protecting the cabin 50 and its contents.

Each of the above annular or round members may be made in a single piece as a closed ring, or from any desired number of straight or curved segments joined end to end.

When vehicle 1a is an entry body or manned spacecraft, the peripheral jet engine is protected by a bottom closure or heat shield 70 fitting completely over it and latched in any suitable manner to the vehicle 1a. The closure 70 will be jettisoned prior to operation of the landing decelerator of course.

One of the important functions of the present invention is further shown in FIGURE 8. When in operation, the jet curtain 71 as described earlier forms an internal volume of pressure $p_1$ against the vehicle bottom. Due to the open spacing between the rocket chambers 60 themselves and between each rocket chamber and the adjacent duct member 53, a forced injection and recirculation of air and/or exhaust gases occurs through the nozzle space 59, as indicated by the returning arrows 72.

Through the jet-pumping action, the mixing and reheating of the injected gas increases the total momentum in the resultant jet curtain, at the same time reducing the mean jet velocity, and therefore increases the propulsive efficiency of the driving jet. This action is also beneficial in creating a thicker peripheral jet curtain with improved coherence, i.e., the ability to sustain pressure lift far from the ground. Further, the detrimental toroidal vortex which forms under an air cushion vehicle is inhibited, thus improving the stability of the overall air cushion system.

Instead of the cooling means described above, an alternative arrangement as shown in FIGURE 10 may be employed. In this embodiment, both the outer and inner skirt flanges 52a and 56a are of double-wall construction and contain a filling of a liquid 75 such as a waterborate solution, for example. This jacket construction extends inwardly to the inlet end of the duct 53a.

At the outer edges of the skirt flanges 52a and 56a, a sealing plug material 76 is inserted. As the vapor temperature and pressure rises in the jacket space containing the liquid 75 when the engine is started, the plug material 76 is melted or blown out and the liquid is released and forcibly ejected into the jet curtain 71 near the end of the landing operation. This further augments the mass flow, cools the jet, and inhibits ignition of combustibles on the landing surface by the jet flame.

Thus it is seen that the present invention provides a peripheral rocket engine ideally adapted to attach to the end or base of a vehicle, and in which the diaphragm augments the thrust by confining the hot gases diffused from the curtain jet against the base of the vehicle. This invention is useful in three regimes of operation: (1) as an expendable solid propellant engine of short time duration near the ground, (2) as a liquid propellant engine for sustained flight propulsion in an atmosphere, and (3) either long or short term operation in a vacuum. The engine used in any of the three regimes is suitable for application as a final landing device. The term "ground" as used herein obviously has reference to any landing surface.

While in order to comply with the statute, the invention has been described in language more or less specific as to structural features, it is to be understood that the invention is not limited to the specific features shown, but that the method and means herein disclosed comprise several forms of putting the invention into effect, and the invention is therefore claimed in any of its forms or modifications within the legitimate and valid scope of the appended claims.

What is claimed is:
1. In a vehicle: a rocket engine, means for attaching said engine to the base of said vehicle, said engine having means defining a peripheral jet nozzle of substantially the same exterior dimensions as the base of said vehicle, said jet nozzle directed substantially perpendicular to the base, said base forming a substantially continuous pressure seal against which a positive pressure differential is built up in operation of said engine, said peripheral jet nozzle comprising an annular space between inner and outer skirts directed slightly inwardly toward the center, and including an annular landing decelerator structure of energy-absorbing material connected to the inner side of said inner skirt and substantially co-extensive therewith.

2. In combination with a vehicle having a base, a peripheral jet rocket engine comprising:
   (a) an annular tubular combustion chamber fixed relative to said base substantially concentrically therewith, a plurality of jet exhaust apertures in said chamber facing radially outward therefrom;
   (b) annular duct means fastened to said base and spaced outwardly from said chamber, said duct means having radial passages positioned with inlets in the path of the jet exhaust from said apertures; and
   (c) said duct means downstream of said radial passages curving substantially 90 degrees away from said base to form an annular nozzle space bounded by an outer and an inner skirt portion.

3. Apparatus in accordance with claim 2 including annular landing skid means of relatively crushable material adjacent the lower side of said radial passages and the inner side of said inner skirt portion.

4. Apparatus in accordance with claim 2 including a removable bottom closure fitting over said rocket engine and having a curved-up periphery mating with the exterior of said vehicle at its base end.

5. A peripheral jet rocket engine comprising:
   (a) a bulkhead-like member forming a substantially sealed central diaphragm;
   (b) at least one annular tubular combustion chamber fixed relative to said bulkhead substantially concentrically therewith, a plurality of jet exhaust apertures in said chamber facing substantially radially outward therefrom;
   (c) annular duct means fastened to said bulkhead and spaced radially outwardly from said chamber, said duct means having radial passages positioned with inlets in the path of the jet exhaust from said apertures; and
   (d) said duct means downstream of said radial passage curving substantially 90 degrees away from said bulkhead to form an annular nozzle space bounded by an outer and an inner skirt portion.

6. Apparatus in accordance with claim 5 including means defining substantial recirculation space from the exit between said skirt portions up into the central portion of said engine to the inlets of said radial passages and into said radial passages around and past said combustion chamber.

7. A rocket engine comprising:
   (a) a substantially continuous structural central diaphragm member;
   (b) an annular combustion chamber fixed peripherally of said diaphragm member, said chamber having a plurality of jet outlets therein;
   (c) duct means mounted adjacent said outlets to receive jet gases therefrom, said duct means having an annular nozzle space directed substantially perpendicular to said diaphragm to provide a peripheral exterior jet curtain, said duct means being spaced radially outwardly from said combustion chamber outlets; and
   (d) air passage means from the plenum within said jet curtain to the inlet of said duct means, whereby recirculation of gaseous products is obtained.

References Cited

UNITED STATES PATENTS

| | | | |
|---|---|---|---|
| 2,633,700 | 4/1953 | Goddard | 60—263 X |
| 3,022,190 | 2/1962 | Feldman | 117—37 |
| 3,128,970 | 4/1964 | Tinajero et al. | 244—100 |
| 3,143,321 | 8/1964 | McGehee et al. | 244—100 |
| 3,175,789 | 3/1965 | Blumrich | 244—100 |
| 3,206,926 | 9/1965 | Lockwood | 60—263 |
| 3,216,191 | 11/1965 | Madison et al. | 60—35.6 |
| 3,270,501 | 9/1966 | Webb | 60—35.6 |

FOREIGN PATENTS 140,692  1/1962  U.S.S.R.

OTHER REFERENCES

Morrow, C. T. et al., Sixth Symposium on Ballistic Missile and Aerospace Technology, N.Y. Academic Press, 1961, volume III, pp. 192–200.

MILTON BUCHLER, *Primary Examiner.*

P. E. SAUBERER, *Assistant Examiner.*